United States Patent [19]
Anglin

[11] Patent Number: 6,026,414
[45] Date of Patent: Feb. 15, 2000

[54] SYSTEM INCLUDING A PROXY CLIENT TO BACKUP FILES IN A DISTRIBUTED COMPUTING ENVIRONMENT

[75] Inventor: Matthew Joseph Anglin, Vail, Ariz.

[73] Assignee: International Business Machines Corporation, Armonk, N.Y.

[21] Appl. No.: 09/035,526

[22] Filed: Mar. 5, 1998

[51] Int. Cl.[7] .................................................. G06F 15/173
[52] U.S. Cl. ...................... 707/204; 707/10; 395/200.33; 395/200.47; 395/684; 395/182.11
[58] Field of Search .................................. 707/9, 10, 204; 395/200.33, 200.36, 200.47, 683, 684, 182.11, 182.09

[56] References Cited

U.S. PATENT DOCUMENTS

| | | | |
|---|---|---|---|
| 5,005,122 | 4/1991 | Griffin et al. | 709/203 |
| 5,408,619 | 4/1995 | Oran | 707/10 |
| 5,628,005 | 5/1997 | Hurvig | 707/8 |
| 5,673,381 | 9/1997 | Huai et al. | 714/1 |
| 5,682,534 | 10/1997 | Kapoor et al. | 709/304 |
| 5,689,701 | 11/1997 | Ault et al. | 707/10 |
| 5,745,752 | 4/1998 | Hurvig et al. | 707/200 |
| 5,845,082 | 12/1998 | Murakami | 709/226 |
| 5,852,724 | 12/1998 | Glenn, II et al. | 709/239 |
| 5,857,102 | 1/1999 | McChesney et al. | 713/100 |
| 5,867,650 | 2/1999 | Osterman | 709/203 |

FOREIGN PATENT DOCUMENTS

| | | |
|---|---|---|
| 0 574 900 A2 | 12/1993 | European Pat. Off. . |
| 0 773 503 A2 | 5/1997 | European Pat. Off. . |
| 2 288 477 | 10/1995 | United Kingdom . |

OTHER PUBLICATIONS

ACM Computing Surveys, vol. 22, No. 4, Dec. 1990, "Distributed File Systems: Concepts and Examples" by Eliezer Levy and Abraham Silberschatz.

IBM Corporation's International Technical Support Organization "ADSM Concepts", SG24–4877–00, Feb. 1997, Chapters 1 & 6.

IBM Corporation's ADSTAR Distributed Storage Manager "Using the UNIX Backup–Archive Clients", Version 3, Release 1, SH26–4075–01, Chapters 1 & 3.

IBM Corporation's ADSTAR Distributed Storage Manager for HP–UX "Administrator's Guide", Version 3, GC35–0320–00, Chapters 4 & 12.

Primary Examiner—Jean R. Homere
Attorney, Agent, or Firm—David W. Victor; Konrad Raynes & Victor

[57] ABSTRACT

Disclosed is a system for backing up files in a distributed computing system. A file server maintains files in a shared name space. The file server provides a first backup client program and a second backup client program with access to the files in the shared name space. The first backup client program initiates a backup request to backup a requested file. A determination is made as to whether the requested file is maintained in a shared name space. The backup request is transmitted to the second backup client program upon determining that the requested file is maintained in the shared name space. The second backup client program transmits a message to the file server to provide the requested file. The file server transmits the requested file with the file server to the second backup client program. The second backup client program then transmits the requested file to a backup server program. The backup server program stores the requested file in a storage device.

24 Claims, 3 Drawing Sheets

SYSTEM INCLUDING A PROXY CLIENT TO BACKUP FILES IN A DISTRIBUTED COMPUTING ENVIRONMENT

FIELD OF THE INVENTION

Preferred embodiments of the present invention relate to a system for backing up files in a distributed computing system and, in particular, using a proxy client to backup files.

BACKGROUND OF THE RELATED ART

In a distributed computing system, different computers, operating systems, and networks interact as if they were all part of a single system. The file system has a single set of global file names. A particular machine in the system need not know where the file is physically located. Instead, the file may be accessed anywhere in the network using the global file name. Global file names are part of the shared name space which devices within the distributed file system may access. One such distributed file system is the Andrew File System (AFS) available through Transarc, Corporation ("Transarc"). An AFS server performs file mapping between the directory name of a file and the location, making the file space location independent. With file independence, a user at a workstation linked to the network need only know the global file name, which includes the path name, and not the physical location where the file resides.

Another distributed system, is the Distributed File System (DFS), available from Transarc and International Business Machines, Corp. (IBM), which is a component of the Distributed Computing Environment (DCE) standard promulgated by the Open Software Foundation (OSF). IBM is the assignee of the subject patent application. The DFS and AFS systems allow users to access data throughout the network. Any changes made by one user to a file is available to all users. The DFS and AFS systems include security services that provide authentication to limit access to authorized users.

The AFS system offered by Transarc includes a backup program called "butc" (Backup Tape Coordinator). Butc is a volume backup system used to dump volume images to tape devices attached to the file server. However, the minimum backup unit for the butc program is a volume as the butc program does not provide support for file-level backup and recovery.

Hierarchical storage management programs, such as the IBM Adstar Distributed Storage Management (ADSM) product, provide backup/archive support and migrates less frequently used files to backup storage to free space. The ADSM server provides hierarchical storage management backing files up on tape drives, optical disks, and other storage medium. The ADSM backup feature saves copies of files from a client computer to a storage space managed by an ADSM server. Thus, data at a client computer running an ADSM client is protected in the event of data loss due to a hardware or software failure, accidental deletion, and/or logical corruption. With the ADSM program, clients can backup volumes, directories, subdirectories or files. ADSM allows incremental backup of only those files that have been changed. In this way, ADSM avoids the need to do a full dump to backup as only those modified files are backed up. This incremental backup reduces network utilization and traffic. The IBM ADSM product is described in "ADSM Version 2 Presentation Guide," (IBM Document SG24-4532-00, International Business Machines, copyright 1995), which publication is incorporated herein by reference in its entirety.

IBM has combined the ADSM product with AFS and DFS file servers to provide backup support for these products. An AFS or DFS server would include an ADSM client to transfer files to an ADSM server, which then backs up the files in a storage device managed by the ADSM server. One problem with using such backup software in a distributed file system is that the client managing backup operations, such as the ADSM client, must read a file to be backed-up. This reading operation consumes network resources. The ADSM client must then consume network resources again by transferring the file it has read from the file server to the ADSM server. Network traffic is further increased if the ADSM client is on a separate machine from the AFS/DFS server. The IBM publications entitled "ADSM AFS/DFS Backup Clients Version 2.1" (IBM Document SH26-4048-00, International Business Machines, copyright 1996) and "ADSM Concepts" (IBM Document SG24-4877--00, International Business Machines, copyright 1997) describe the use of the ADSM software in an AFS/DFS distributed file system. These publications are incorporated herein by reference in their entirety.

Network traffic can be significantly increased if the AFS/DFS server and backup server are in one physical location, i.e., San Jose, Calif., and the AFS/DFS client and backup client requesting to backup a file in the AFS/DFS server are in a distant geographical location, i.e., Tucson, Ariz. If a user in Tucson wanted to backup a file that resided in the global name space managed by the AFS/DFS server in San Jose, prior art client/server protocol would have the AFS/DFS client in Tucson read the file, which requires transmittal of the file from San Jose to Tucson over the network, and then send the file back to the backup server in San Jose for backup storage. Such network traffic problems are exasperated when the client requesting the backup is separated by a long geographical distance from the server.

SUMMARY OF THE INVENTION

To address the shortcomings in the prior art described above, preferred embodiments of the present invention provide a system for backing up files in a distributed computing system. A file server maintains files in a shared name space. The file server provides a first backup client program and a second backup client program with access to the files in the shared name space. The first backup client program initiates a backup request to backup a requested file. A determination is made as to whether the requested file is maintained in the shared name space. The backup request is transmitted to the second backup client program upon determining that the requested file is maintained in the shared name space. The second backup client program transmits a message to the file server to provide the requested file. The file server transmits the requested file with the file server to the second backup client program. The second backup client program then transmits the requested file to a backup server program. The backup server program stores the requested file in a storage device.

In further embodiments, the first backup client program is on a first computer machine, the second backup client program is on a second computer machine, the backup server program is on a third computer machine, and the file server is on a fourth computer machine. The first computer, second computer, third computer, and fourth computer communicate over a network system.

In yet further embodiments, the first backup client program is on a first computer machine, the second backup client program and backup server program are on a second computer machine, and the file server program is on a third computer machine. The first computer machine, second computer machine, and third computer machine communicate over a network system.

It is an object of preferred embodiments of the present invention to provide a system for backing up files in a shared name space maintained in a file server which is part of a distributed computing environment on a storage device managed by a backup server program, such as a hierarchical storage management program.

It is yet a further object to reduce network traffic throughout the distributed computing environment by having a proxy client including a copy of the backup client program read the file from the file server and transmit the file to the backup server to store in a storage device. In this way, a client at a remote location backing up a file does not read a file and retransmit such file back to the location from where the file came.

It is still a further object that data throughput rates be increased between the backup client program and the backup server program when the backup client program transmits files to the backup server program.

It is yet a further object that authentication be provided in using a proxy client to access files in the file server.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
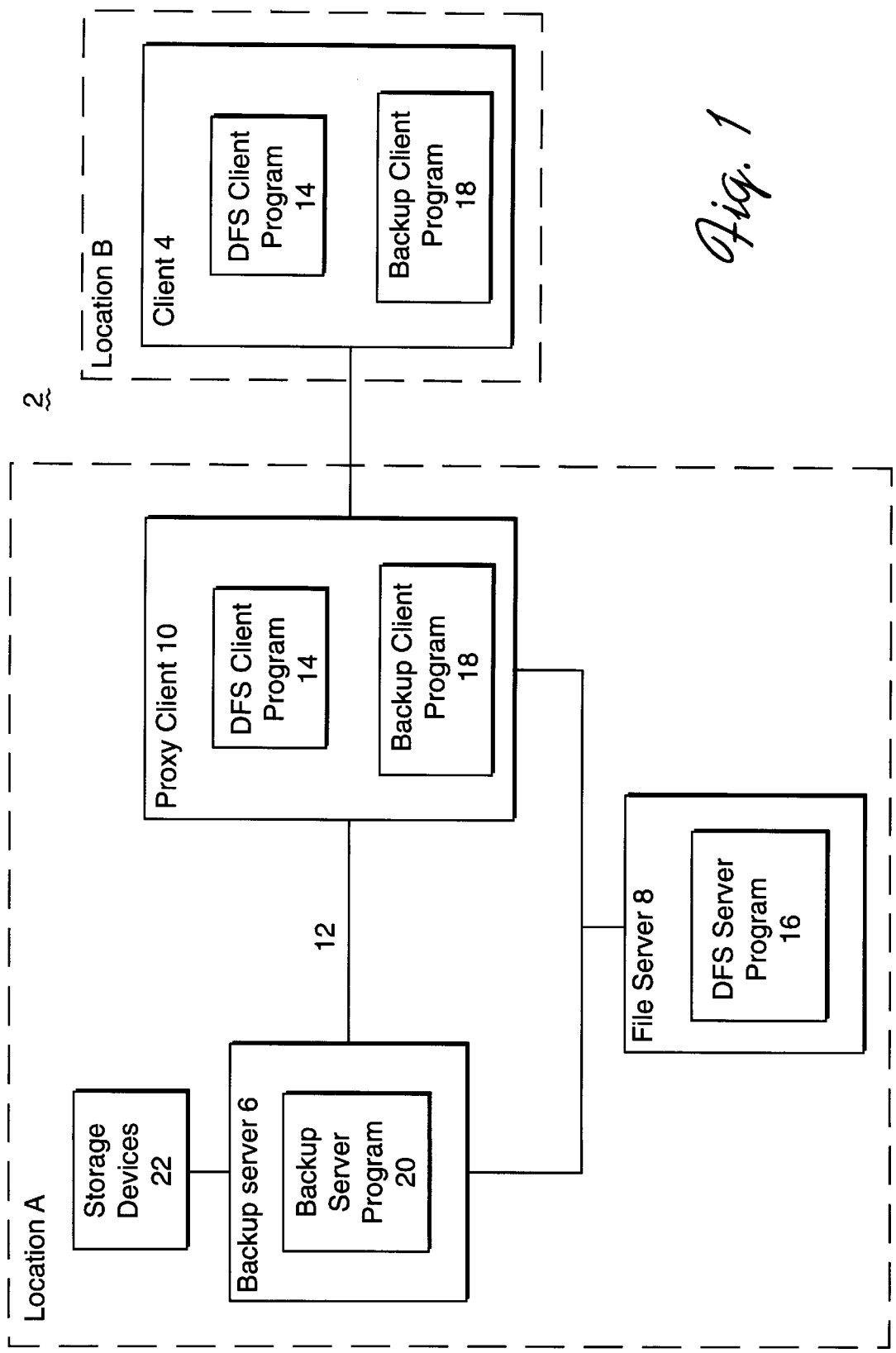
FIG. 1 is a block diagram illustrating a software and hardware environment in which preferred embodiments of the present invention are implemented.
Figure 2:
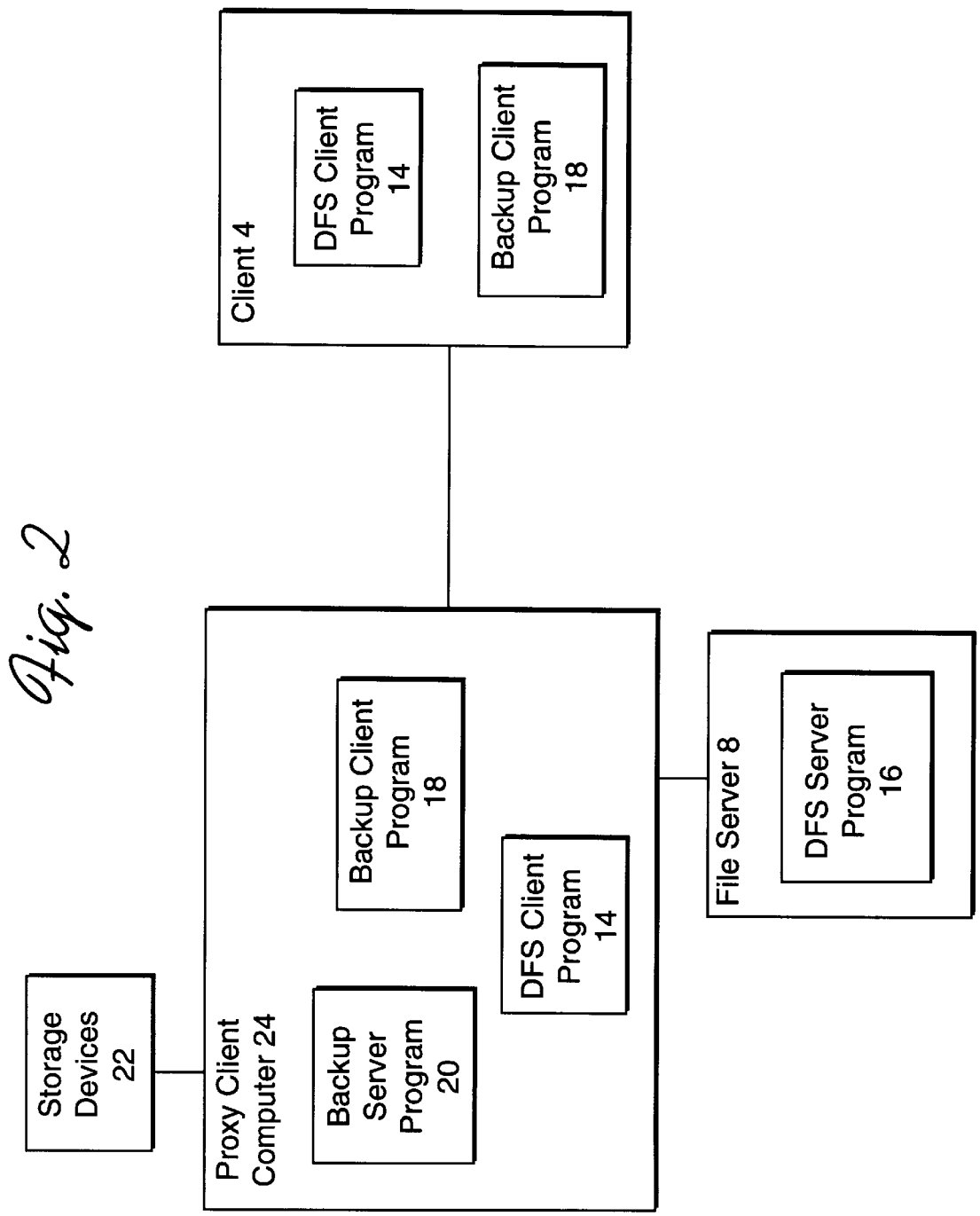
FIG. 2 is a block diagram illustrating an alternative software and hardware environment in which preferred embodiments of the present invention are implemented.

FIGS. 1 and 2 illustrate hardware and software environments in which preferred embodiments of the present invention are implemented. FIG. 1 illustrates a distributed computing system 2 comprised of four separate computing machines: a client 4, a backup server 6, a file server 8, and a proxy client 10. These four computing machines may be comprised of a personal computer, workstation, mainframe, etc. The computers 4, 6, 8, 10 would include an operating system such as AIX, OS/2, Unix, Microsoft Windows, etc. These four machines 4, 6, 8, 10 include software to allow the machines to function as components in a distributed computing system 2, such as the IBM or Transarc Distributed Computing Environment (DCE) products. These computer machines 4, 6, 8, 10 may communicate via any suitable network technology known in the art, such as LAN, WAN, SNA networks, TCP/IP, the Internet, etc.

In the embodiment of FIG. 1, the backup server 6, storage devices 22, proxy client 10, and file server 8 are located in a Location A and the client 4 is in a Location B. Location A and B may be in distant geographical locations. In alternative embodiments, the file server 8, backup server 6, proxy client 10, and client 4 can be in a single location, dispersed throughout a single site, dispersed throughout different sites in the same geographical proximity, dispersed throughout different sites at distant geographical locations, etc. If the proxy client 10 and backup server 6 are on separate machines, then a high-speed connection line 12, e.g., a HIPPI or a high speed switch, such as the high speed switch built into the SP2 architecture, could connect the proxy client 10 and backup server 6.

The client 4 and proxy client 10 include a distributed file system (DFS) client program 14 that provides communication with the file server 8 and access to files in a shared name space. The file server 8 includes a DFS server program 16 that manages the shared name space and makes data in the shared name space available to machines within the distributed computing system 2 running the DFS client program 14. The DFS server program 16 further runs various distributed file system management processes. The DFS server program 16 and client program 14 may be part of a distributed file system (DFS) such as the AFS and DFS systems available from Transarc, the IBM Distributed Computing Environment (DCE), the Network File Server ("NFS") products from Sun Microsystems, Inc, or any other suitable distributed file system software known in the art. The terms "DFS client program" and "DFS server program," as used herein, refer generally to a DFS system and not to the particular DFS system provided by Transarc, IBM, or any other software provider. The DFS client program 14 and server program 16 include a communication protocol that allows the client 4 and proxy client 10, including the DFS client program 14, to interface with the file server 8 via the DFS server program 16. In preferred embodiments, the DFS client program 14 and server program 16 may include a protocol, such as the DCE Remote Procedure Call (RPC), to provide communication therebetween. However, those skilled in the art will appreciate that alternative DFS communication protocols could be used to provide communication among systems within the distributed computing environment.

Machines running the DFS client program 14 are capable of accessing files in the shared name space managed by the DFS server program 16, regardless of where those files are physically located. The files would conform to a uniform global name space, providing attached machines 4, 6, 8, 10 with a global view of a set of files and directories independent of machine boundaries. The client 4, backup server 6, file server 8, and proxy client 10 may access the same shared name space and use the same global naming system in the distributed computing system 2. This allows access to the shared name space regardless of where the client 4, backup server 6, file server 8, and proxy client 10 are located.

The file server 8 or some other machine could perform authentication services to allow clients, such as client 4 and proxy client 10, to access files in a file server 8. In preferred embodiments, the DCE/RPC authentication protocols are implemented in the DFS client 14 and server 16 programs. Under such authentication protocols, when a user at a client 4 logs in, the client 4 requests a ticket to provide the client 4 access to a set of files maintained by the file server 8. To access a file in the shared name space, the client 4 or proxy client 10 establishes communication with the DFS server program 16 in the file server 8 using the RPC protocol. Part of this protocol would require the client 4 or proxy client 10 to present the authentication ticket to the DFS server program 16, which would determine whether the requesting client 4, 10 can access the files requested in the shared name space.

In preferred embodiments, the client 4 may establish communication with the proxy client 10 via an RPC call between the DFS client programs 14 in the client 4 and proxy client 10. The client 4 could transfer its authentication ticket to the proxy client 10 through the RPC protocol. The proxy client 10 could, in turn, establish communication with the file server 8 via an RPC call established between the DFS client program 18 in the proxy client 10 and the DFS server program 16 in the file server 8. Once communication is established, the proxy client 10 could use the authentication ticket provided by the client 4 to access files in the shared name space. In this way, the proxy client's 10 level of access to the file server 8 is limited to the level of access provided the client 4 because the proxy client 10 uses the authentication ticket from the client 4 to access the shared name space.

The client 4 includes a backup client program 18 that allows the client 4 to communicate with the backup server 4 to backup data to which the client 4 has access. The backup client program 18 may be comprised of any program that allows a client to communicate with a server to backup and archive data, such as the IBM ADSM client. The backup server 6 includes a backup server program 20 that stores and manages data in storage devices 22. The storage devices 22 may be comprised of any non-volatile memory device suitable for long term storage of data, such as a tape library, optical disk library, hard disk drives, holographic units, etc. The backup server program 20 may include a database program to manage and track the location of data in the storage devices 22. The backup server program 20 further includes communication protocol software to communicate with the backup client program 18. The backup server program 20 may be comprised of any program that allows a server to manage and backup data in an attached storage device 22, such as the IBM ADSM server program.

In preferred embodiments the backup client program 18 may transfer a backup request to another backup client program 18. For instance, the backup client program 18 in the client 4 may transfer a request to backup a file in the file server 8 to the backup client 18 in the proxy client 10.

FIG. 2 illustrates an alternative embodiment in which the proxy client 24 is a single computer machine including the backup server program 20, the DFS client program 14, and the backup client program 18. The proxy client computer 24 may be a personal computer, workstation, mainframe, etc. The proxy client computer 24 and file server 8 may be in the same geographical location and/or site, and the client 4 may be at another site and/or distant geographical location. In the embodiment of FIG. 2 where the backup client program 18 and backup server program 20 are located on the same computer machine (node) 24, the backup client 18 and server 20 programs may communicate using the memory of the proxy client computer 24. For instance, the IBM ADSM product provides a shared memory protocol for transferring data between an ADSM client and server located on the same machine using a common memory area on the computer machine. The backup client program 18 would access and read data and transmit such data through the shared memory space to the backup server program 20. The backup server program 20 would read the data copied to the shared memory space and then manage the storage of the transmitted data to the storage devices 22. As with the embodiment in FIG. 1, the backup client program 18 and backup server program 20 share the same global file name space through the DFS client program 14 which provides access to the file server 8 and files maintained therein. The proxy client computer 24 executes the DFS client program 14 to interface with the DFS server program 16 and access files in the shared name space maintained in the file server 8.

Thus, the preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

Using the Proxy Client to Backup Data

Figure 3:
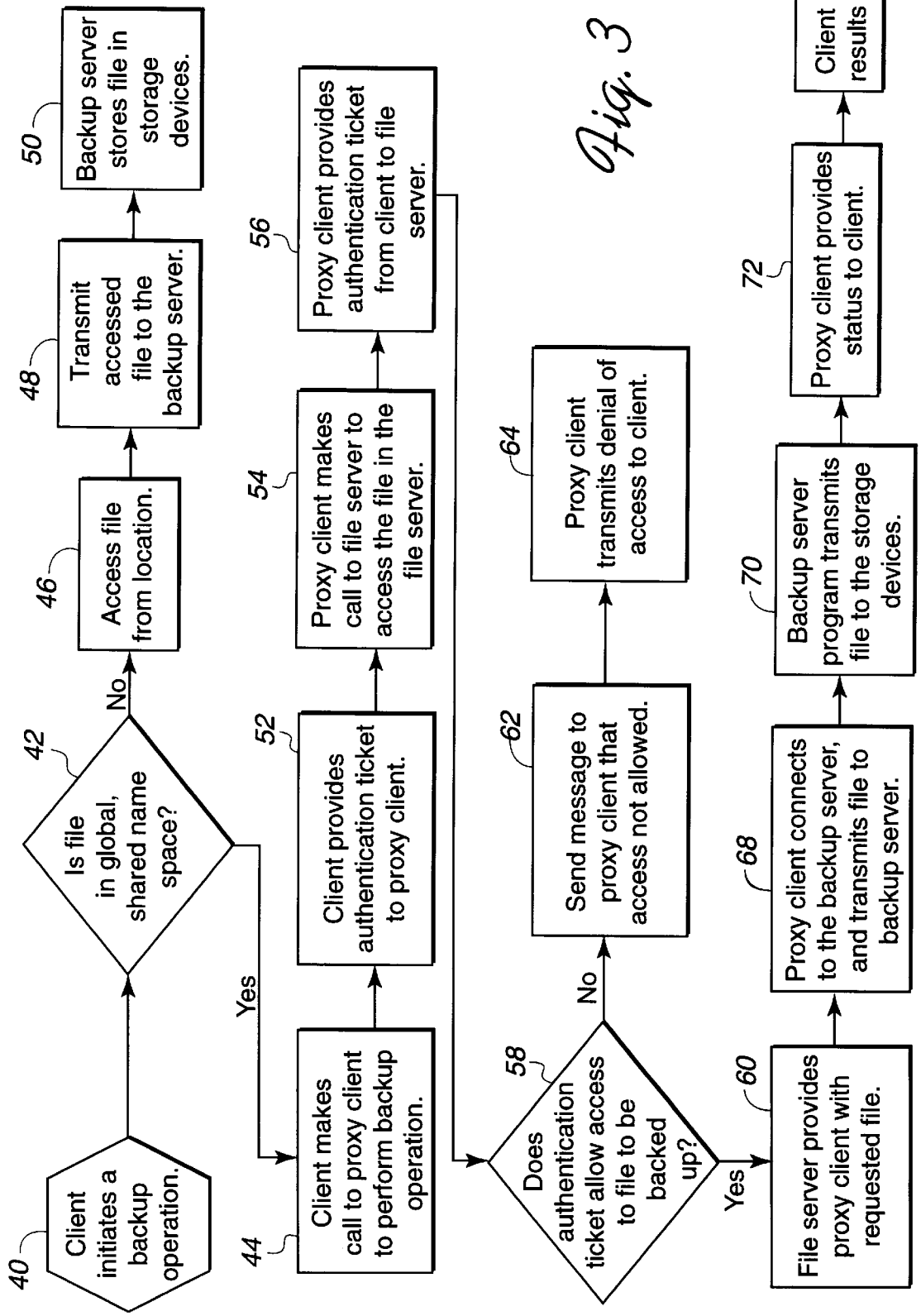
FIG. 3 is a flowchart showing logic to retrieve and backup data in accordance with preferred embodiments of the present invention.

FIG. 3 is a flowchart illustrating logic implemented in the programs 14, 16, 18, 20 described in FIGS. 1 and 2 to back-up files maintained in the file server 8 in storage devices 22 managed by the backup server program 20. Those skilled in the art will recognize that this logic is provided for illustrative purposes only and that different logic may be used to accomplish the same results.

Control begins at block 40 which represents the client 4 initiating a backup operation of a file with the backup client program 18. The term "file" as used herein refers to an entire volume, logical unit, directory, subdirectory, individual file or any other image of data. Control transfers to block 42 which is a decision block representing the backup client program 18 and/or DFS client program 14 determining whether the file to be backed up is in the shared name space. In the AFS file system, including "/afs" in the file path typically indicates that a file is in a shared name space. In the DFS file system, including "/ . . . " typically indicates that a file is in a shared name space. If the requested file is in the shared name space then control transfers to block 44; otherwise, control transfers to block 46. If the file is not in the shared name space, then at block 46, the backup client program 18 in the client 4 accesses the file and reads the file. Control transfers to block 48 which represents the backup client program 18 in the client 4 transmitting the accessed file to the backup server 6. At block 50, the backup server, operating under control of the backup server program 20, backs up the file in the storage devices 22.

If the file is in the shared name space, then, at block 44, the client 4, operating under control of the DFS client program 14, makes a call to the proxy client 10 to perform the backup operation. The client 4 may use the RPC protocol to interface with the proxy client 10. In side the proxy client 10, the backup request is passed to the backup client program 18. Control transfers to block 52 which represents the client 4, using the DCE/RPC protocol, passing an authentication ticket presented to the client 4. The client 4 may include the authentication ticket with the request to the proxy client 10 to backup the file. This authentication ticket determines the level of access the client 4 has to the file server 8. Control transfers to block 54 which represents the proxy client 10 making a call to the file server 8 to access the file to be backed up. In the preferred embodiments, the proxy client 10, under control of the DFS client 14, makes a RPC call to the DFS server program 16 in the file server 8 to access the shared name space. Control transfers to block 56 which represents the proxy client 10, through the RPC call established with the DFS client 14 and server 6 programs, providing the authentication ticket passed from the client 4 to the file server 8. The proxy client 10 may include the authentication ticket with the call to the file server 8 to access the file.

Control proceeds to block 58 which is a decision block representing the DFS server program 16 in the file server 8 determining whether the authentication ticket permits the proxy client 10 to access the file to be backed up. If so, control transfers to block 60; otherwise, control transfers to block 62. If the authentication ticket does not permit access to the file to be backed up, then control proceeds to block 62 which represents the file server 8 sending a message to the proxy client 10 that access to the file is not permitted. At block 64, the proxy client 10 notifies the client 4 that access to the file to be backed up was denied. As discussed, in preferred embodiments, the client 4 and proxy client 10 can communicate using the RPC interface.

If the authentication ticket from the client 4 permits access to the file, then at block 60, the file server 8 provides the requested file to the proxy client 10 via the call established between the DFS client program 14 in the proxy client 10 and the DFS server program 16 in the file server 8. Control proceeds to block 68 which represents the backup client program 18 in the proxy client 10 transmitting the file provided from the file server 8 to the backup server program 20 in the backup server 6. As discussed, the backup client program 18 in the proxy client 10 may communicate with the backup server program 20 via the high speed communication line 12. Control transfers to block 70 which represents the backup server program 20 transferring the file to the storage devices 22. In preferred embodiments, the backup server program 20 transfers data from the proxy client 10 the storage devices 22 simultaneously as the data is transmitted from the proxy client 10. Control transfers to block 72 which represents the proxy client 10 providing status information to the client 4 upon completion of the file backup. Control then proceeds to block 74 which represents the client 4 providing the status information to the user at client 4.

If authentication was unnecessary, then the logic of FIG. 3 would not include the steps to authenticate the level access for the proxy client 10. In such case, the file server 8 would provide the requested file to the proxy client 10 without performing authentication verification to determine if access is permitted to the requested file.

The logic described in FIG. 3 is implemented in a distributed computing environment 2 in which the proxy client 10, including the backup client program 18, and the backup server program 20 are on a separate computer machines 6, 10, such as in the environment described in FIG. 1. In the alternative embodiment of FIG. 2, the backup client program 18 and the backup server program 20 are installed on the same proxy client computer 24. Thus, the proxy client computer 24 includes the backup server program 20. In such case, at block 68, the backup client program 18 would transfer the file to be backed up to the backup server program 20 via a shared memory space and not the high speed transmission line 12 as is the case with FIG. 1. In alternative embodiments, the backup client program 18 and backup server program 20 may communicate via the network system providing communication among the devices in the distributed computing system 2.

With the preferred embodiments discussed above, network traffic is significantly reduced because the client 4, which may be in a distant geographical location, e.g., Location B, from where the backup server 6 and file server 8 are located, e.g., Location A, does not have to read the file from the file server 8 and then retransmit the file back to the backup server 6. Greater reductions in network traffic are further realized if the backup server 6, proxy client 10 and file server 8 are in a proximate location. Network traffic may be further reduced in those embodiments which utilize a separate high speed connection 12 (FIG. 1) between the proxy client 10 and the backup server 6 to allow the backup client program 18 in the proxy client 10 to transfer the file to the backup server program 20 at higher data rates and bypass the main communication lines of the network.

Conclusion

This concludes the description of the preferred embodiments of the invention. The following describes some alternative embodiments for accomplishing the present invention.

Preferred embodiments utilize current available products, such as ADSM, DFS, AFS, and NFS. However, any suitable program capable of performing the functions described herein could be substituted for the preferred embodiments described herein.

In preferred embodiments, certain operations are described as being performed by certain computer programs 14, 16, 18, 20. However, those skilled in the art will appreciate that an alternative combination of programs could be used to implement the logic of preferred embodiments of the invention. Moreover the programs 14, 16, 18, 20 may themselves be comprised of one or more component computer programs, e.g., executable and data files, that function together to perform the operations described with respect to programs 14, 16, 18, 20.

In summary, preferred embodiments disclose a system for backing up files in a distributed computing system. A file server maintains files in a shared name space. The file server provides a first backup client program and a second backup client program with access to the files in the shared name space. The first backup client program initiates a backup request to backup a requested file. A determination is made as to whether the requested file is maintained in a shared name space. The backup request is transmitted to the second backup client program upon determining that the requested file is maintained in the shared name space. The second backup client program transmits a message to the file server to provide the requested file. The file server transmits the requested file with the file server to the second backup client program. The second backup client program then transmits the requested file to a backup server program. The backup server program stores the requested file in a storage device.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for backing up files in a distributed computing system, comprising the steps of:

maintaining, with a file server, files in a shared name space, wherein a first backup client program and a second backup client program are capable of accessing files in the shared name space via the file server;

initiating a backup request with the first backup client program to backup a requested file;

determining whether the requested file is maintained in the shared name space, transmitting the backup request from the first backup client program to the second backup client program upon determining that the requested file is maintained in the shared name space;

transmitting a message with the second backup client program to the file server to provide the requested file;

transmitting the requested file with the file server to the second backup client program;

transmitting with the second backup client program the requested file to a backup server program; and storing with the backup server program the requested file in a storage device.

2. The method of claim 1, wherein the first backup client program is on a first computer machine, the second backup client program is on a second computer machine, the backup server program is on a third computer machine, and the file server is on a fourth computer machine, wherein the first computer machine, second computer machine, third computer machine, and fourth computer machine communicate over a network system.

3. The method of claim 2, wherein the second backup client program and the backup server program communicate via a high speed communication line connecting the second computer machine and the third computer machine.

4. The method of claim 2, wherein the first and second computer machines include a distributed file system (DFS) client program and wherein the file server includes a DFS server program, wherein the DFS client program and DFS server program interface the first and second computer machines with the file server to allow access to files in the shared name space maintained by the file server.

5. The method of claim 2, further including the steps of:

issuing an authentication ticket to the first computer machine providing access to a set of files in the shared name space;

transmitting with the first computer machine the authentication ticket to the second computer machine;

transmitting with the second computer machine the authentication ticket to the file server in the fourth computer machine; and determining with the file server whether the requested file is in the set of files to which the authentication ticket permits access, wherein the step of transmitting the requested file with the file server to the second computer machine including the second backup client program occurs upon determining that the requested file is in the set of files to which the authentication ticket permits access.

6. The method of claim 1, wherein the first backup client program is on a first computer machine, the second backup client program and backup server program are on a second computer machine, and the file server program is on a third computer machine, wherein the first computer machine, second computer machine, and third computer machine communicate over a network system.

7. The method of claim 6, wherein the second backup client program and the backup server program communicate via a shared memory within the second computer machine.

8. The method of claim 6, wherein the first backup client program communicates the request to backup the file to the second backup client program, wherein the first and second computer machines include a distributed file system (DFS) client program, wherein the file server includes a DFS server program, further including the step of the DFS client program in the second computer machine interfacing with the DFS server program in the third computer machine to provide the second computer machine access to files in the shared name space maintained by the file server.

9. A distributed computing system for backing up files in a shared name space, comprising:

(a) a first backup client program, including means for initiating a backup request to backup a requested file;

(b) a second backup client program;

(c) a backup server program;

(d) a storage device managed by the backup server program;

(e) a file server, wherein the file server provides access to files included in a shared name space, wherein the first backup client program and the second backup client program have access to files maintained in the shared name space through the file server;

(f) means for determining whether the requested file is included in the shared name space;

(g) means for transmitting the backup request to the second backup client program upon determining that the requested file is included in the shared name space;

(h) means for transmitting a message with the second backup client program to the file server to provide the requested file;

(i) means, performed by the file server, for transmitting the requested file to the second backup client program;

(j) means, performed by the second backup client program, for transmitting the requested file to the backup server program; and (k) means, performed by the backup server program, for storing the requested file in the storage device.

10. The distributed computing system of claim 9, further including:

a first computer machine including the first backup client program;

a second computer machine including the second backup client program;

a third computer machine including the backup server program;

a fourth computer machine including the file server; and a network system providing communication among the first computer machine, second computer machine, third computer machine, and fourth computer machine.

11. The distributed computing system of claim 10, further including a high speed communication line connecting the second computer machine and the third computer machine, wherein the second backup client program and the backup server program communicate via the high speed communication line.

12. The distributed computing system of claim 10, further including:

a distributed file system (DFS) client program included within the first and second computer machines; and a DFS server program included in the file server, wherein the DFS client program and DFS server program interfaces the first and second computer machines and the file server to allow access to files in the shared name space maintained by the file server.

13. The distributed computing system of claim 10, further including:

means for issuing an authentication ticket to the first computer machine providing access to a set of files in the shared name space;

means, performed by the first computer machine, for transmitting the authentication ticket to the second computer machine;

means, performed by the second computer machine, for transmitting the authentication ticket to the file server in the fourth computer machine; and means, performed by the file server, for determining whether the requested file is in the set of files to which the authentication ticket permits access.

14. The distributed computing system of claim 9, further including:

a first computer machine including the first backup client program;

a second computer machine including the second backup client program and the backup server program;

a third computer machine including the file server program;

a network system providing communication between the first computer machine, the second computer machine, and the third computer machine.

15. The distributed computing system of claim 14, further including a shared memory within the second computer machine, wherein the second backup client program and the backup server program communicate via the shared memory.

16. The distributed computing system of claim 14, further including:

a distributed file system (DFS) client program in the second computer machine;

a DFS server program included in the file server, wherein the DFS client program interfaces the second computer machine with the DFS server program to access files in the shared name space maintained by the file server.

17. An article of manufacture for use in programming a distributed computing system including a file server maintaining files in a shared name space, a first backup client program and a second backup client program, wherein the first and second backup client programs are capable of accessing files in the shared name space via the file server, the article of manufacture comprising at least one computer readable storage device including at least one computer program embedded therein that causes components within the distributed computing system to perform the steps of:

(a) initiating a backup request with the first backup client program to backup a requested file;

(b) determining whether the requested file is maintained in the shared name space;

(c) transmitting the backup request to the second backup client program upon determining that the requested file is maintained in the shared name space;

(d) transmitting a message with the second backup client program to the file server to provide the requested file;

(e) transmitting the requested file with the file server to the second backup client program;

(f) transmitting with the second backup client program the requested file to a backup server program; and (g) storing with the backup server program the requested file in a storage device.

18. The article of manufacture of claim 17, wherein the first backup client program is on a first computer machine, the second backup client program is on a second computer machine, the backup server program is on a third computer machine, and the file server is on a fourth computer machine, wherein the first computer machine, second computer machine, third computer machine, and fourth computer machine communicate over a network system.

19. The article of manufacture of claim 18, wherein the second backup client program and the backup server program communicate via a high speed communication line connecting the second computer machine and the third computer machine.

20. The article of manufacture of claim 18, wherein the second computer machine includes a distributed file system (DFS) client program and wherein the file server includes a DFS server program, wherein the DFS client program and DFS server program interface the second computer machine with the file server to allow access to files in the shared name space maintained by the file server.

21. The article of manufacture of claim 18, further including the steps of:

issuing an authentication ticket to the first computer machine providing access to a set of files in the shared name space;

transmitting with the first computer machine the authentication ticket to the second computer machine;

transmitting with the second computer machine the authentication ticket to the file server in the fourth computer machine;

determining with the file server whether the requested file is in the set of files to which the authentication ticket permits access, wherein the step of transmitting the requested file with the file server to the second computer machine including the second backup client program occurs upon determining that the requested file is in the set of files to which the authentication ticket permits access.

22. The article of manufacture of claim 17, wherein the first backup client program is on a first computer machine, the second backup client program and backup server program are on a second computer machine, and the file server program is on a third computer machine, wherein the first computer machine, second computer machine, and third computer machine communicate over a network system.

23. The article of manufacture of claim 22, wherein the second backup client program and the backup server program communicate via a shared memory within the second computer machine.

24. The article of manufacture of claim 22, wherein the first computer machine communicates the request to backup the file from the first backup client program to the second backup client program in the second computer machine, wherein the second computer machine includes a distributed file system (DFS) client program, and wherein the file server includes a DFS server program, wherein the DFS client program interfaces the second computer machine with the DFS server program to provide the second computer machine access to files in the shared name space maintained by the file server.

* * * * *